United States Patent [19]

Erickson

[11] Patent Number: 4,549,936
[45] Date of Patent: Oct. 29, 1985

[54] COMBINED DISTILLATION APPARATUS AND HOT LIQUID SYSTEM

[76] Inventor: James L. Erickson, 417 River Ave., Sauk Rapids, Minn. 56379

[21] Appl. No.: 537,819

[22] Filed: Sep. 30, 1983

[51] Int. Cl.$^4$ ............................................. B01D 3/02
[52] U.S. Cl. .................................. 202/167; 202/177; 202/180; 202/235; 203/DIG. 8
[58] Field of Search ................... 203/DIG. 8, 10, 11; 202/163, 167, 176, 177, 180, 235, 232

[56] References Cited

U.S. PATENT DOCUMENTS 4,102,752  7/1978  Rugh ............................. 203/DIG. 8

*Primary Examiner*—Frank Sever

*Attorney, Agent, or Firm*—Conrad A. Hansen

[57] ABSTRACT

A combined distillation apparatus and hot liquid system having a hot liquid heater connected to a cold liquid storage tank and in which the distilled liquid delivers its heat to the cold incoming liquid within the cold liquid storage tank so that the cold incoming liquid is preheated for subsequent delivery to the hot liquid heater. A heat dissipation coil located within or closely adjacent to the cold liquid storage tank has a first coil being filled with a coolant, which is the cold incoming liquid captured from the cold liquid storage tank, and a second coil being filled with the distilled liquid so that the distilled liquid may be cooled before re-entering the condenser and mixing with the steam and vapor entering the condenser.

13 Claims, 3 Drawing Figures

COMBINED DISTILLATION APPARATUS AND HOT LIQUID SYSTEM

BACKGROUND OF THE INVENTION

The invention relates to the field of liquid purification devices and provides a purification apparatus by which distillation utilizes heat from a hot liquid heater and much of that heat is recaptured in a cold liquid storage tank and returned to the hot liquid heater.

In many parts of the world, the ground water supplies are unsuitable for drinking or normal household use and accordingly purified water is a necessity. In such areas, it is helpful for individual homes and business establishments to have an apparatus which will distill water economically. Since the distillation process requires both a source of heat to generate the steam associated with the process and a source of cooling to condense the steam, it is desirable to find inexpensive means for providing both the heating and cooling needed for the distillation process.

Often there are already available hot water and cold water sources where needed heat and cooling aid are available at little extra cost by better utilization of those sources. Examples of such sources include laundries, car washes, power companies and industrial facilities which generate substantial quantities of hot water from cooling of machinery, product, or the like.

The present invention is directed toward solving this problem and provides a workable and economical solution to it.

SUMMARY OF THE INVENTION

This invention combines a water purification apparatus with a source of hot and cold water such as the larger systems found in laundries, car washes and industrial heat transfer systems and is also usable in smaller systems like those of many households. It utilizes a standard hot liquid or water heater as the source of hot liquid for evaporation. The evaporation process occurs in a partial vacuum so that the liquid evaporates at a lower than usual temperature. With this evaporation process, water will evaporate at a temperature of approximately 90 degrees Fahrenheit. The condensing operation is accomplished by use of cold distilled liquid and such cold liquid is cooled by cold liquid enroute to the heater and continually re-used as a condensing means.

In order to keep the recycled distilled liquid cool and suitable for condensing, it is necessary to remove the accumulated heat from the distilled liquid, and it is to this area that the invention is directed. A conventional, state of the art, hot liquid heater has an outlet pipe which feeds the various hot water pipes of the household or business establishment such as car washes, washing machines, dishwashers and the like. The hot liquid heater receives a supply of cold city water or liquid through a city water inlet pipe leading to the city water main or liquid storage tank. When the distillation apparatus is not functioning, the incoming city water or cold liquid follows the just described path to the hot liquid heater, is raised to a suitable temperature and delivered to the household or business establishment.

An evaporation chamber is connected with the hot liquid heater so that hot liquid will flow from the heater into the evaporation chamber, and a first pump along the evaporation chamber exit pipe moves the hot liquid from the evaporation chamber back to the hot liquid heater and produces continuous hot liquid cycling from the hot liquid heater to the evaporation chamber and back to the hot liquid heater. A partial vacuum is present above the liquid level and consequently the liquid in the evaporation chamber boils at a lower temperature than the boiling point of the liquid and substantial steam and vapor move upwardly along a vapor retention pipe which leads into the condenser.

Steam and vapor entering the condenser encounter a supply of cold, already distilled, pure water which condenses the steam and vapor and causes it to mix with the already supplied cold distilled liquid, all such distilled water and condensed steam leaving the condenser along a condenser exit pipe and being moved by a second pump into a large distilled liquid storage vessel. Periodically, excess distilled liquid is drawn off through a relief valve connected to the distilled liquid storage vessel. A reasonable supply of distilled liquid is retained in the distilled liquid storage vessel.

A heat dissipation coil is connected to the distilled liquid storage vessel and is either contained within or positioned directly adjacent to the cold liquid storage tank. The heat dissipation coil captures heat from the distilled liquid and transfers the heat to the incoming cold liquid in order that the cold incoming liquid within the cold liquid storage tank is preheated before being injected into the hot liquid heater.

If the coil is positioned external to the storage tank, the heat dissipation coil is a double coil with the first coil being filled with a coolant and the second coil with the distilled liquid or vice versa. The coolant is cold liquid taken from the base of the cold liquid storage tank. Therefore, while the cold liquid entering the tank is being preheated by warmed coolant returning from the coil to the cold liquid storage tank, the distilled liquid within the heat dissipation coil is being cooled so that it can be re-used for condensation of further vapor entering the condenser. The result of this invention is that distillation is being produced as a result of already existing heat from the hot liquid heater and much of that heat is being recaptured in the cold liquid storage tank as a result of the heat dissipation coil and thereby returned to the hot liquid heater.

Other objects and advantages of the invention will become apparent from the following detailed description and appended drawings in which like numbers have been used to describe like parts of the several views.

DESCRIPTION OF THE PREFERRED EMBODIMENT

Figure 1:
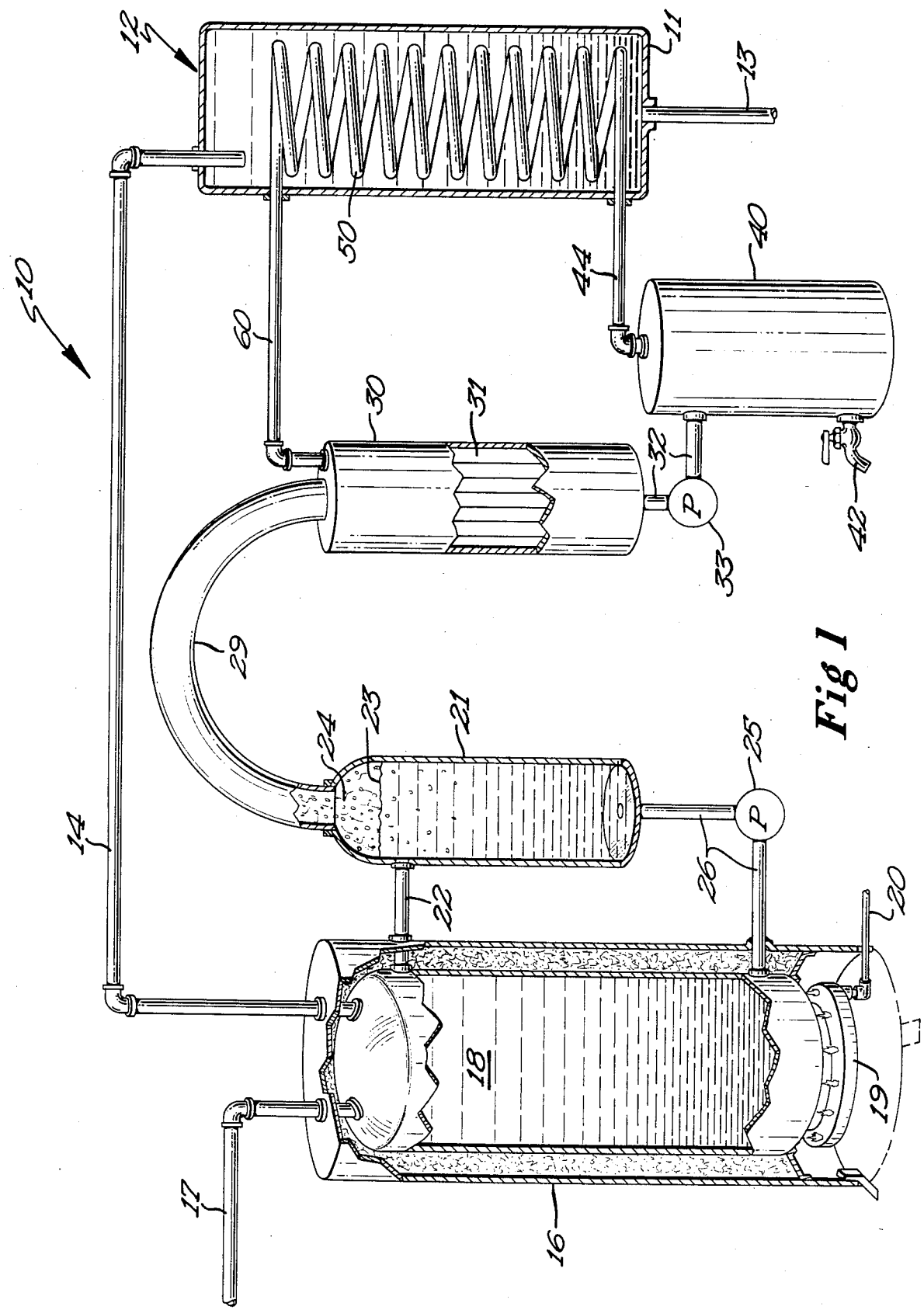
FIG. 1 is a schematic view of the combined distillation apparatus and hot liquid heater with sectional and cutaway views of specific features.

Referring now to FIG. 1, a combined distillation apparatus and hot liquid system 10 is shown which is suitable for distilling and heating large amounts of liquids for households or business establishments, such as car washes, hospitals, institutions and the like. Cold incoming liquid enters a cold liquid storage tank 12 through a cold incoming liquid inlet 13. The cold incoming liquid exits the cold liquid storage tank 12 by means of pipe 14 and enters a hot liquid heater 16. The cold liquid is heated within the hot liquid heater 16 by means of gas burner 19 which has gas supplied through gas inlet 20. The hot liquid heater 16 has a hot liquid exit pipe 17 which feeds the hot liquid 18 contained within the hot liquid heater 16 to the various hot liquid pipes of the household or business establishment, such as washing machines, dishwashers and the like. When the below-described distillation apparatus is not functioning, the cold incoming liquid follows the just described path from the cold liquid storage tank 12 through pipe 14 into the hot liquid heater 16 and is raised to a suitable temperature and delivered to the household or business establishment.

An evaporation chamber 21 is connected with the hot liquid heater 16 by means of pipe 22. The pipe 22 provides for an outlet means so that hot liquid 18 will flow from the heater 16 into the evaporation chamber 21. A partial vacuum is present above the liquid level 23 of the evaporation chamber 21 and consequently the hot liquid in evaporation chamber 21 boils at a lower temperature than the boiling point of the liquid. For instance, hot water in the evaporation chamber 21 boils at a temperature of approximately 90 degrees Fahrenheit. The substantial steam and vapor 24 generated by the evaporation chamber 21 move upwardly along vapor retention pipe 29 and lead into the condenser 30.

A pipe 26 connected between the evaporation chamber 21 and the hot liquid heater 16 provides for an inlet means to convey liquid from the chamber 21 to the heater 16. A first pump 25 connected between the evaporation chamber 21 and the hot liquid heater 16 along pipe 26 moves the hot liquid from the evaporation chamber 21 back to the hot liquid heater 16. This produces continuous hot liquid cycling from the hot liquid heater 16 to the evaporation chamber 21 and back to the hot liquid heater 16.

A condenser 30 having a bubble tube 31 therein receives the steam and vapor 24 from the vapor retention pipe 29. The steam and vapor 24 are condensed within the condenser 30 and exit the condenser 30 as distilled liquid. A second pump 33 is connected between the condenser 30 and distilled liquid storage tank 40 along pipe 32. The second pump 33 moves the distilled liquid and condensed steam and vapor leaving the condenser 30 into a large distilled liquid storage tank 40. The distilled liquid storage tank 40 retains and accumulates the distilled liquid therein. Periodically, excess distilled liquid may be drawn off through a relief valve 42 which is attached at the base of the distilled liquid storage tank 40.

Figure 2:
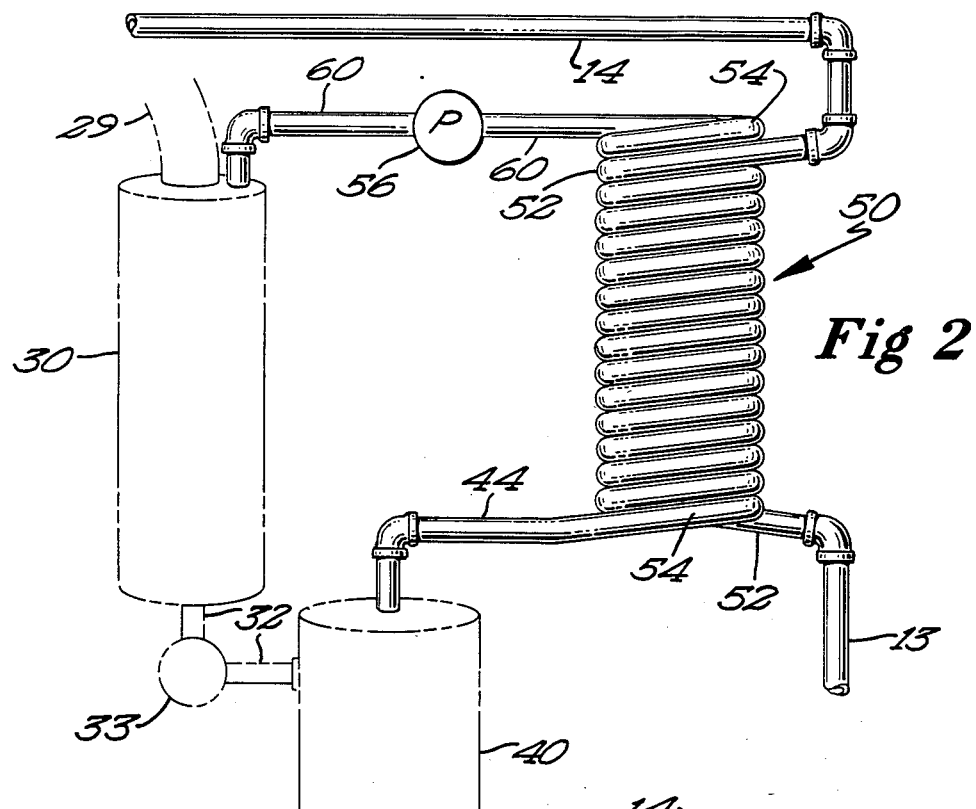
FIG. 2 is an alternative embodiment of the combined distillation apparatus and hot liquid heater with the heat dissipation coil being a double coil.

The hot distilled liquid leaves the distilled liquid storage tank 40 through pipe 44 and enters a heat dissipation coil 50. The heat dissipation coil 50, as shown in FIG. 1, may be located within the cold liquid storage tank 12. As shown in FIG. 2, the heat dissipation coil 50 may also be located closely adjacent to the cold liquid storage tank 12 (not shown) and the desired result of the system 10 will also be achieved. The heat dissipation coil 50 can also be a double coil, as shown in FIG. 2, with the first coil 52 being filled with a coolant and the second coil 54 being filled with the hot distilled liquid or vice versa. The coolant in the first coil 52 is the cold incoming liquid captured from the base of the cold liquid storage tank 12. The coil 50 captures heat from the hot distilled liquid and transfers the heat to the incoming cold liquid within the cold liquid storage tank 12 in order that the cold incoming liquid within the cold liquid storage tank 12 is preheated before being injected into the hot liquid heater 16. At the same time the cold incoming liquid is being preheated within the cold liquid storage tank 12, the coolant within the first coil 52 of the heat dissipation coil 50 cools the distilled liquid within the second coil 54. The cooled distilled water within the second coil 54 leaves the heat dissipation coil 50 by means of pipe 60. A third pump 56 connected along pipe 60 between the second coil 54 and the condenser 30 moves the distilled liquid from the second coil 54 to the condenser 30. The second coil 54 can also include pipes 44 and 60 as the second coil 54 transports the distilled liquid. Therefore, the steam and vapor particles 24 entering the condenser from pipe 29 encounters and is mixed with the supply of cold, already distilled liquid within the condenser 30 which condenses the steam and vapor particles 24.

Figure 3:
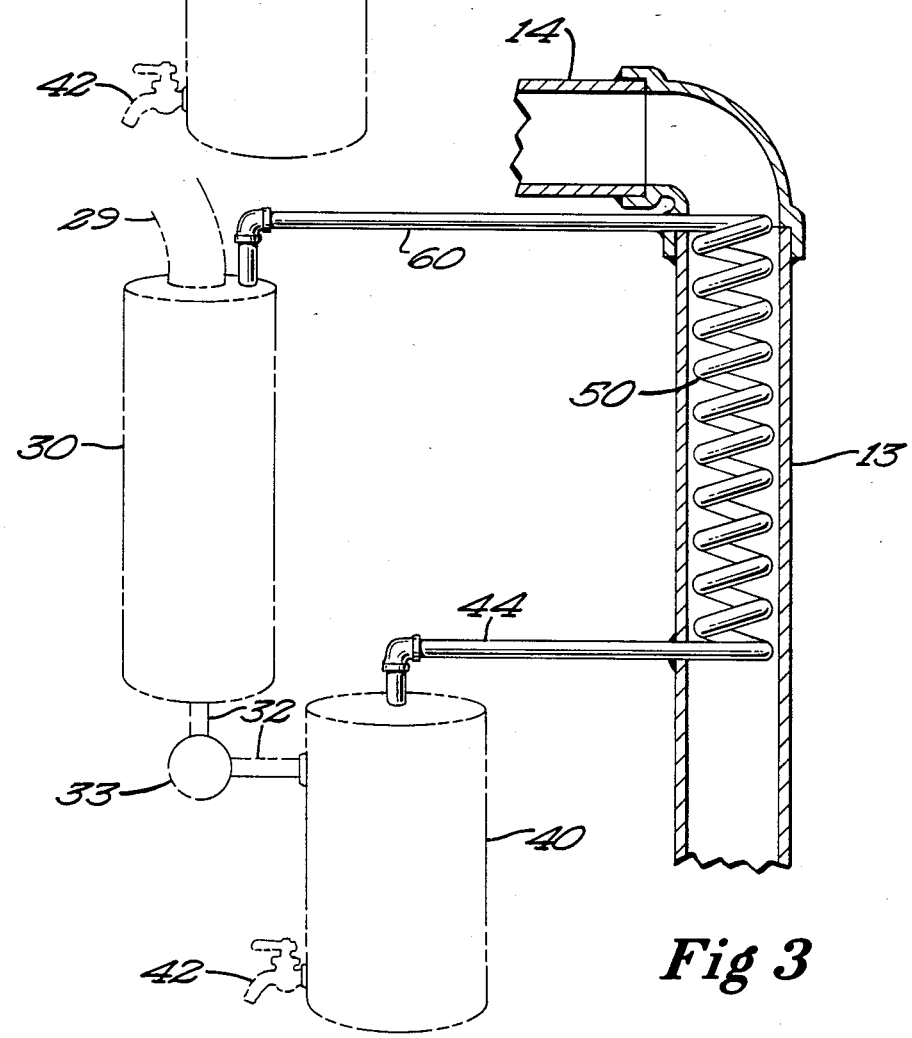
FIG. 3 is also an alternative embodiment of the combined distillation apparatus and hot liquid heater with the heat dissipation coil inside the cold liquid delivery means.

The third embodiment of the system 10 is shown in FIG. 3 wherein a cold liquid storage tank 12 is not required for the system 10 to achieve its desired performance. The cold incoming liquid inlet 13 is connected directly with pipe 14 and provides for a cold liquid delivery means wherein the cold liquid can flow directly to the hot liquid heater 16. The heat dissipation coil 50 may be located directly within the cold incoming liquid inlet 13. As in the previous system, distilled liquid from the distilled liquid storage tank 40 enters the coil 50 by means of pipe 44. The hot distilled liquid flows through the coil 50 preheating the cold incoming liquid through the liquid inlet 13. The distilled liquid within the coil 50 is also cooled by the cold liquid within the liquid inlet 13. The distilled liquid exits coil 50 through pipe 60 and is returned to the condenser 30 as previously discussed.

The result of the system 10 is that the condensed liquid which is warmed in the condenser 30 is pumped into or adjacent to the cold liquid storage tank 12 by means of the heat dissipation coil 50 not only for cooling the condensed liquid is transferred to the incoming cold liquid in order that the incoming cold liquid is preheated before being injected into the hot liquid heater 16. Another result of the system 10 is that distillation is being produced as a result of heat from the hot liquid heater 16 and much of that heat is being recaptured in the cold liquid storage tank 12 and returned to the hot liquid heater 16.

The system 10 is particularly advantageous when it can be installed in a laundry, car wash, restaurant or the like where large quantities of hot liquid are used. The greater the amount of hot liquid consumed from the hot liquid heater 16, the greater the amount of cold liquid which flows through the cold liquid storage tank 12 thereby assuring that the distilled liquid passing through pipe 60 is cold to assure more efficient distillation.

While the preferred embodiments of the present invention have been described, it should be understood that various changes, adaptations and modifications may be made therein without parting the spirit of the invention and the scope of the appended claims.

What is claimed is:

1. A combined water heating system and distillation apparatus for preheating a source of cold incoming water to supply hot water to a utilization device while simultaneously distilling the water to purify the water comprising:

a hot water heater to heat the water to a predetermined temperature;

means for connecting said hot water heater to the utilization device so as to be able to supply hot water to the utilization device;

means designed, sized and arranged for recovering otherwise wasted energy from launderies, households, car washes, power facilities, industrial facilities and the like, for distilling water, including:

a cold water storage tank connectable to the source of cold incoming water and connected in fluid flow relationship in said hot water heater to deliver the cold water from said storage tank to said hot water heater;

an evaporation chamber connected in fluid flow relationship with said heater for evaporating the heated water in said chamber into vapor so that the hot water will flow from said hot water heater into said evaporation chamber;

outlet means connecting said evaporation chamber with said heater to convey hot water between said chamber and said heater;

a condenser connected in fluid flow relationship with said evaporation chamber to receive the vapor exiting said evaporation chamber and convert it to distilled water;

a distilled water storage vessel connected in fluid flow relationship to said condenser for containment of the distilled water leaving said condenser; and a heat dissipation coil connected in fluid flow relationship between said distilled water storage vessel and said condenser and positioned within said cold water storage tank to lower the temperature of the distilled water flowing through said coil from said distilled water storage vessel to said condenser and to preheat the cold incoming water within said tank so that much of the heat released during condensation is being recaptured by water within said cold water storage tank for subsequent return to said hot water heater.

2. The combined distillation apparatus and hot liquid system of claim 1 and further including:

inlet means connecting said heater with said chamber to convey liquid from said chamber to said heater; and a first pump connected in fluid flow relationship with said inlet means between said evaporation chamber and said hot liquid heater for moving the hot liquid from said evaporation chamber back to said hot liquid heater producing continuous hot liquid cycling from said hot liquid heater to said evaporation chamber and back to said hot liquid heater.

3. The combined distillation apparatus and hot liquid system of claim 1 and further including:

a second pump connected between said condenser and said distilled liquid storage vessel moving the distilled liquid and condensed vapor exiting said condenser into said distilled liquid storage vessel.

4. The combined distillation apparatus and hot liquid system of claim 1 wherein:

said heat dissipation coil includes first and second coils, with said first coil being connected with the cold incoming liquid of said cold liquid storage tank so such cold liquid will serve as a coolant, and said second coil being connected with said vessel to carry distilled liquid so that the distilled liquid is cooled by the coolant before re-entering said condenser and mixing with the vapor entering said condenser.

5. The combined distillation apparatus and hot liquid system of claim 4 and further including a third pump connected in fluid flow relationship with said second coil to move the distilled liquid through said second coil.

6. A combined water heating system and distillation apparatus for preheating a source of cold incoming water to supply hot water to a utilization device while simultaneously distilling the water to purify the water comprising:

a hot water heater to heat the water to a predetermined temperature;

means for connecting said hot water heater to the utilization device so as to be able to supply hot water to the utilization device;

means designed, sized and arranged for recovering otherwise wasted energy from launderies, households, car washes, power facilities, industrial facilities and the like for distilling water, including:

a cold water storage tank connectable to the source of cold incoming water and connected in fluid flow relationship with said hot water heater to deliver the cold liquid from said storage tank to said hot water heater;

an evaporation chamber connected in fluid flow relationship with said heater to receive hot water for evaporating the heated water into vapor;

outlet means connecting said evaporation chamber with said heater to convey hot water between said chamber and said heater;

a condenser connected in fluid flow relationship to said evaporation chamber to receive the vapor exiting said evaporation chamber and convert it to distilled water;

a distilled water storage vessel connected in fluid flow relationship with said condenser for containment of the distilled water leaving said condenser;

a heat dissipation coil connected to said distilled water storage vessel and located closely abutting said cold water storage tank for preheating the cold incoming water so that much of the heat released during condensation is recaptured by water within said cold water storage tank and returned to said hot water heater and also lowering the temperature of the distilled water passing through said heat dissipation coil; and said condenser also being connected in fluid flow relationship to said heat dissipation coil and receiving the cold distilled water exiting said coil wherein the cold distilled water encounters the vapor entering said condenser thereby condensing the vapor.

7. The combined distillation apparatus and hot liquid system of claim 6 and further including:

inlet means connecting said heater with said chamber to convey liquid from said chamber to said heater; and a first pump connected in fluid flow relationship with said inlet means between said evaporation chamber and said hot liquid heater for moving the hot liquid from said evaporation chamber back to said hot liquid heater, producing continuous hot liquid cycling from said hot liquid heater to said evaporation chamber and back to said hot liquid heater.

8. The combined distillation apparatus and hot liquid system of claim 6 and further including:
   a second pump connected between said condenser and said distilled liquid storage vessel for moving the distilled liquid and condensed vapor exiting said condenser into said distilled liquid storage vessel for containment of the distilled liquid.

9. The combined distillation apparatus and hot liquid system of claim 6 wherein:
   said heat dissipation coil includes first and second coils, with said first coil being connected with the cold incoming liquid of said cold liquid storage tank so such cold liquid will serve as a coolant, and said second coil being connected with said vessel to carry distilled liquid so that the distilled liquid is cooled by the coolant before re-entering said condenser and mixing with the vapor entering said condenser.

10. The combined distillation apparatus and hot liquid system of claim 9 and further including:
    a third pump connected in fluid flow relationship with said second coil to move the distilled liquid through said second coil.

11. A combined water heating system and distillation apparatus for preheating a source of cold incoming water to supply hot water to a utilization device while simultaneously distilling the water to purify the water comprising:
    a hot water heater to heat the water to a predetermined temperature;
    means for connecting the hot water heater to the utilization device so as to be able to supply hot water to the utilization device; and
    means designed, sized and arranged for recovering otherwise wasted energy from launderies, households, car washes, power facilities, industrial facilities and the like, for distilling water, including:
      a cold water delivery means connectable with the source of cold incoming water and having a heat dissipation coil in heat transfer relationship therewith, said cold liquid delivery means being connected in fluid flow relationship with said hot water heater to deliver the cold water from said delivery means to said hot water heater;
      an evaporation chamber connected in fluid flow relationship with said heater for evaporating the heated water into vapor so that the hot water will flow from said hot water heater into said evaporation chamber;
      outlet means connecting said evaporation chamber with said heater to convey hot water between said chamber and said heater;
      a condenser connected in fluid flow relationship with said evaporation chamber to receive the vapor exiting said evaporation chamber and convert it to distilled water;
      a distilled water storage vessel connected in fluid flow relationship to said condenser for containment of the distilled water leaving said condenser; and
      said heat dissipation coil connected in fluid flow relationship between said distilled water storage vessel and said condenser to lower the temperature of the distilled water flowing through said coil from said distilled water storage vessel to said condenser and to preheat the cold water within said cold water delivery means so that much of the heat released during condensation is being recaptured by water within said cold water delivery means for subsequent return to said hot water heater.

12. The combined distillation apparatus and hot liquid system of claim 11 and further including:
    inlet means connecting said heater with said chamber to convey liquid from said chamber to said heater; and
    a first pump connected in fluid flow relationship with said inlet means between said evaporation chamber and said hot liquid heater for moving the hot liquid from said evaporation chamber back to said hot liquid heater producing continuous hot liquid cycling from said hot liquid heater to said evaporation chamber and back to said hot liquid heater.

13. The combined distillation apparatus and hot liquid system of claim 11 and further including:
    a second pump connected between said condenser and said distilled liquid storage vessel moving the distilled liquid and condensed vapor exiting said condenser into said distilled liquid storage vessel.

* * * * *